United States Patent [19]
Slootman et al.

[11] Patent Number: 6,038,245
[45] Date of Patent: Mar. 14, 2000

[54] PROCESS FOR MELTING A CHARGE IN AN ELECTRICAL ARC FURNACE

[75] Inventors: Franck Slootman, Le Mesnil-St-Denis, France; Nicolas Perrin, Singapore, Singapore; Frédéric Viraize, Sceaux, France

[73] Assignee: L'Air Liquide, Societe Anonyme pour L'Etude et L'Exploitation des Procedes Georges Claude, Paris, France

[21] Appl. No.: 09/068,450
[22] PCT Filed: Jun. 18, 1996
[86] PCT No.: PCT/FR96/00940
   § 371 Date: May 8, 1998
   § 102(e) Date: May 8, 1998
[87] PCT Pub. No.: WO97/00413
   PCT Pub. Date: Jan. 3, 1997

Related U.S. Application Data

[63] Continuation of application No. 08/555,792, Nov. 9, 1995, Pat. No. 5,822,357.

[30]     Foreign Application Priority Data

Jun. 19, 1995 [FR] France ................................ 95 07308

[51] Int. Cl.[7] .................................................. F27D 1/00
[52] U.S. Cl. .................................. 373/72; 373/2; 373/85
[58] Field of Search ........................... 373/2, 9, 72, 85, 373/80; 266/41, 47, 156, 159, 186; 75/60, 530; 62/636, 924

[56]     References Cited

U.S. PATENT DOCUMENTS

| 4,730,336 | 3/1988 | Herneisen et al. | 373/2 |
| 5,166,950 | 11/1992 | Jouvaud et al. | 373/2 |
| 5,373,530 | 12/1994 | Perrin | 373/85 |
| 5,444,733 | 8/1995 | Coassin et al. | 373/72 |
| 5,685,172 | 11/1997 | Darredeau et al. | 62/636 |
| 5,822,357 | 10/1998 | Slootman et al. | 373/72 |

FOREIGN PATENT DOCUMENTS

| 0 257 450 | 8/1987 | European Pat. Off. . |
| 0 462 898 | 6/1991 | European Pat. Off. . |
| 0 625 685 | 4/1994 | European Pat. Off. . |
| 0 627 492 | 5/1994 | European Pat. Off. . |
| 2 688 801 | 9/1993 | France . |
| WO95/09336 | 4/1995 | WIPO . |
| WO97/00413 | 1/1997 | WIPO . |

*Primary Examiner*—Tu Ba Hoang
*Attorney, Agent, or Firm*—Burns, Doane, Swecker & Mathis, L.L.P.

[57]     ABSTRACT

Provided is a process for melting a charge in a furnace. Energy of fusion is supplied to the charge, and gases including at least one combustible gas are generated during the the melting. A post-combustion of the combustible gas is performed by injecting an oxidant gas containing more than 25% by volume of oxygen during at least some periods of the process. The oxidant gas is injected above the charge, in the form of at least one oxidant gas jet. Each jet has a flow rate of between approximately 50 and 1200 $Sm^3/h$ and a speed of injection into the furnace of between approximately 5 m/s and 150 m/s. The process has particular applicability to an electrical furnace for melting scrap for the production of steel.

26 Claims, 6 Drawing Sheets

PROCESS FOR MELTING A CHARGE IN AN ELECTRICAL ARC FURNACE

CROSS-REFERENCE TO RELATED APPLICATIONS

This application is a 371 of PCT International Application No. PCT/FR96/0940, filed Jun. 18, 1996, and is a CIP of U.S. application Ser. No. 08/555,792, filed Nov. 9, 1995 now U.S. Pat. No. 5,822,357.

BACKGROUND OF THE INVENTION

1. Field of the Invention

The present invention relates to a process for melting a charge in a furnace, in particular an electrical arc furnace, by supplying energy of fusion to the charge, in which gases, and notably at least one combustible gas, in particular carbon monoxide, are generated during the melting of the charge, in which process an oxidant gas containing more than 25% by volume of oxygen is injected during at least some periods, in order to carry out post-combustion of the combustible gases.

The term "oxidant gas containing more than 25% by volume of oxygen" means a gas which contains at least 25% by volume of oxygen under standard temperature and pressure conditions, in particular oxygen-enriched air containing preferably more than 50% by volume of oxygen, but more preferably oxygen which is industrially pure, that is to say having at least 88% by volume of oxygen, including in particular oxygen generated by adsorption equipment of the VSA (Vacuum Switch Adsorption) type, or any other generator of industrially pure oxygen, including systems employing membranes.

2. Description of the Related Art

In an electrical arc furnace, in particular an electrical arc furnace for melting scrap with a view to the production of steels, the scrap is melted essentially by supplying energy of fusion to this charge through graphite electrodes of the furnace, through which a very heavy current is passed so as to release a sufficient amount of energy to melt the scrap present in the said furnace.

Fossil energy is currently being used more and more to increase the productivity of these furnaces. Hence, the use of coals charged in baskets or injected through lances permits the use ossil energy. This energy is only partially used insofar as the combustion of the coal is incomplete. Thus, large quantities of carbon monoxide, CO, are themselves released by the oxidation of the carbon. This carbon monoxide is burnt with oxygen in the furnace according to the process termed post-combustion for an electrical arc furnace and described, for example, in U.S. Pat. Nos. 5,166,950, 5,373,530 and EP-A-127,492.

U.S. Pat. No. 5,166,950, in the name of the Applicant Company, describes a process and an installation for melting a charge in, notably, an electrical arc furnace for melting scrap and producing steels, by supplying energy of fusion to the charge and with post-combustion of the fumes by injecting an oxygen-containing gas into a space of the furnace located above the charge. In the process described, the oxygen injectors are used to create rotating gas streams turning in opposite directions in the space of the furnace located above the charge. The effect of this is to ensure effective mixing of the oxygen-containing oxidant gas with the combustible gases present, such as the carbon monoxide and/or hydrogen produced by the charge, so as to cause uniform post-combustion of these gases in the furnace, which post-combustion contributes to the melting of this charge in cooperation with the vertical electrodes distributed around and in the vicinity of the vertical axis of the furnace.

U.S. Pat. No. 5,373,530 (as well as EP-A-127,492) describe an oxygen-containing gas injector passing through the casing of the furnace in order to deliver an oxygen-containing gas jet which is non-radial with respect to the axis of the furnace.

A post-combustion process for an electrical arc furnace is also known from the article "Oxygen Injection for Effective Post-Combustion in the Electrical Arc Furnace", P. Mathur and G. Daughtridge, this process using oxygen injection above the pool at a supersonic speed (in general greater than 300 m/s), in which the oxygen strikes the surface of the molten metal pool (the slag), which causes oxidation of the iron in form of iron oxide FeO, oxidation of the iron with the carbon dioxide gas which is present, generating iron oxide FeO, carbon monoxide, as well as a reaction of the carbon with the carbon dioxide to generate carbon monoxide. This supersonic oxygen injection thus generates a gas mixture containing a quantity of carbon dioxide gas and also a quantity of carbon monoxide, which results notably from the aforementioned reactions. Thus, the drawback of such a process is that it does not fully use the possibility of generating energy by employing the carbon monoxide produced in the furnace.

SUMMARY OF THE INVENTION

The object of the process according to the invention is to improve the energy efficiency of the post-combustion by maximizing both the energy released by this post-combustion and the transfer of the corresponding energy to the metal pool, while ensuring high durability of the refractory lining of the furnace and without excessive oxidation of the electrodes. To this end, the process according to the invention promotes as far as possible the reaction of carbon monoxide with oxygen, so as to form carbon dioxide, to the detriment of the other undesired reactions, notably the reactions involving oxidation of iron with oxygen ($Fe + \frac{1}{2}O_2 \Rightarrow FeO$) and carbon dioxide gas with iron ($CO_2 + Fe \Rightarrow FeO + CO$).

The process for melting a charge in a furnace according to the invention is characterized in that, during the periods in which the post-combustion is carried out, the oxidant gas is injected at low rate above the charge, in the form of at least one oxidant gas jet, each jet having a flow rate of between approximately 50 and 1,200 $Sm^3/h$ and a speed of injection into the furnace of between approximately 5 m/s and 150 m/s and preferably between 50 m/s and 125 m/s.

In a preferred embodiment of the invention, in which the furnace is an electrical arc furnace, the process according to the invention is characterized in that the injection direction of each combustible gas jet coincides substantially with the main gas streams generated by the arc flame, preferably in countercurrent flow.

According to another embodiment of the invention, the process is characterized in that a holding flow rate of oxidant gas injection into the furnace is provided, at least during some periods in which no post-combustion is produced in the furnace, at a speed of between approximately 5 m/s and 20 m/s, so as to prevent or reduce any clogging of the oxidant gas injectors.

According to another embodiment of the invention, the process is characterized in that at least one oxidant gas jet is injected tangentially with respect to the wall of the furnace, at an angle of between 25° and 40°, preferably of the order of approximately 30°.

According to another embodiment of the invention, the latter is characterized in that at least one oxidant gas jet is injected downwards from the side wall of the furnace, at an angle of between 10° and 20°, and preferably of the order of approximately 15°, with respect to the horizontal.

Also preferably, the oxidant gas will be injected using at least three injectors, preferably at least four injectors, preferably uniformly distributed over the lateral surface of the furnace. However, when the requisite space is available in the furnace, it is preferable to provide as many injectors as possible, for example six or even eight injectors. Each oxidant gas jet will preferably have a flow rate of between approximately 80 and 850 $Sm^3/h$ and an injector outlet speed of between approximately 50 and 125 m/s, preferably approximately 100 m/s.

Preferably, the fumes from the furnace will be analysed continuously and the oxidant gas flow rate will be adjusted as a function of the results of this analysis. This means that if more combustible gases are present, commensurately more oxygen will be injected, but with stepped oxygen injection so as to limit the temperature in the vicinity of the injectors to a value which is compatible with the thermal stability of the side panels of the furnace (water-cooled panels distributed is all around the furnace). The oxidant gas flow rate will thus generally be variable during the casting.

The fume analysis will preferably consist in a measurement of the carbon monoxide concentration in the fumes (example: 4% of CO by volume).

Preferably, use will also be made of a plurality of groups of injector s having, at their outlet, a component which is tangential with respect to the vertical axis of the furnace, the successive groups of injectors being arranged at the same level or at different levels.

According to another alternative embodiment of the invention, the holding flow rate in the furnace may also be produced with air.

It is also possible, and sometimes preferable, to preheat the oxidant gas before injecting it into the furnace. To do this, it may be possible to preheat the oxidant gas which preferably contains more than 25% by volume of oxygen, for example by indirect heat exchange with the furnace. It is also possible to mix at least some of the fumes leavin the furnace with the oxidant gas before injecting them both into the furnace. In this case, the oxidant gas (fume+oxidant gas mixture) may contain-less than 25% by volume, and even less than 21% by volume, of oxygen.

As regards the number of injectors, at least six injectors will preferably be used, because as a general rule the more injectors are used, the better the results. These injectors will also preferably all be located in the upper half of the furnace and, more preferably, in the upper half of the furnace with respect to the level of the metal.

BRIEF DESCRIPTION OF THE DRAWINGS

The invention will be better understood with the aid of the following illustrative embodiments, given without implying any limitation, in conjunction with the figures, in which.

DETAILED DESCRIPTION OF THE PREFERRED EMBODIMENTS OF THE INVENTION

Figure 1:
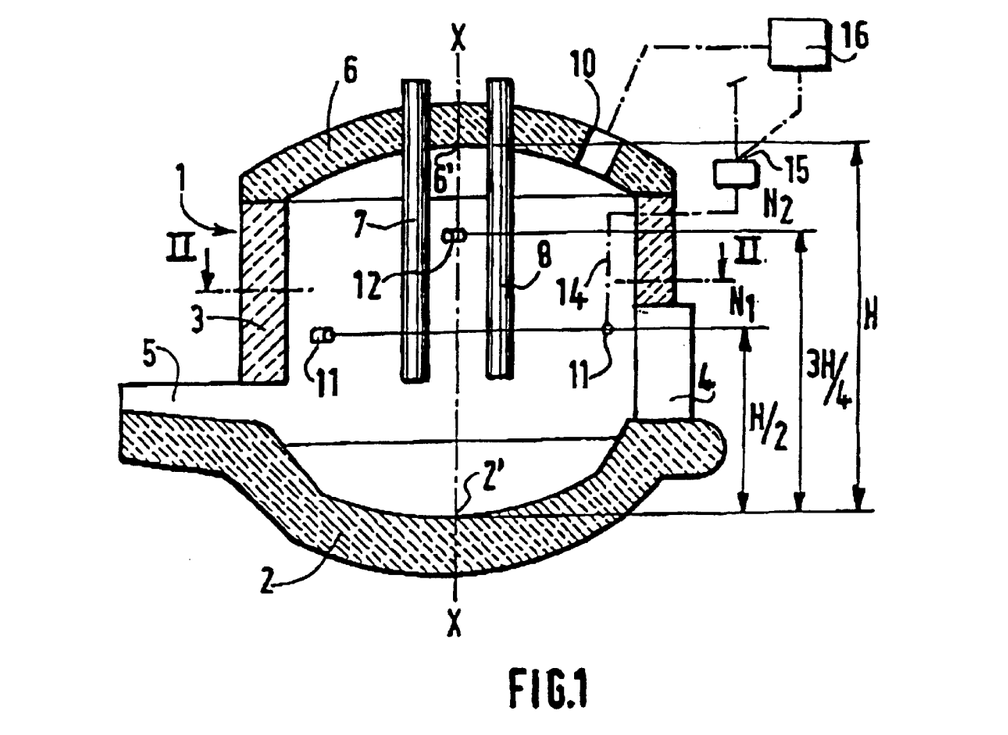
FIG. 1 represents a schematic view in vertical section of an electrical furnace for implementing the invention.
Figure 2:
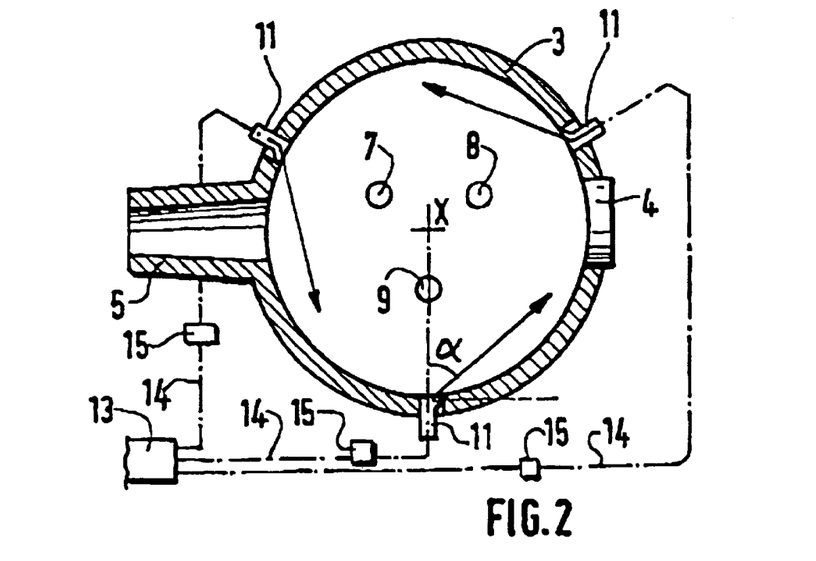
FIG. 2 represents a schematic view, taken in horizontal section along the line II—II in FIG. 1.

The electrical arc furnace represented in FIGS. 1 and 2 is intended for melting scrap with a view to producing steel. It includes a bottom 2, a side wall 3 with a so-called slag door 4 and a pouring spout 5 for the molten product as well as a roof 6 which also forms a support for three electrodes 7, 8, 9 equally distributed about a vertical axis X—X. The roof includes an outlet conduit 10 for the fumes.

The furnace 1 is equipped with at least two stepped series, respectively 11 and 12, of at least two, typically at least three, injectors for oxygen-containing gas. The first series of injectors 11 is located at a level $N_1$, close to halfway up the height H between the lowest point 2' of the bottom 2 and the uppermost point 6' of the roof 6, whereas the second series of injectors 12 is located at a level $N_2$ which represents approximately ¾ of this same height H. The injectors, 11 on the one hand and 12 on the other hand, are therefore located in two stepped horizontal planes, the vertical separation between which is of the order of quarter of the maximum roof height H. Each injector is oriented in such a way as to have a main tangential component and a centripetal radial component. The outlets of the lower series of injectors 11, at level $N_1=H/2$, are all oriented, when viewed from above, in the anticlockwise direction, so as to form a lower gas stream with anticlockwise rotating circulation (FIG. 2). The outlets of the injectors 12 of the upper series of injectors, at level $N_2=3H/4$, are all oriented, when viewed from above, in the clockwise direction, so as to form an upper gas stream with clockwise rotating circulation.

The injectors are supplied with oxygen having a purity of at least 90% from a source 13 (FIG. 2) via respective conduits 14 fitted with respective adjustment components 15.

The furnace also includes an analyser 16 for the carbon monoxide (CO) content in the fumes discharged through the conduit 10, this analyser having means for controlling the components 15 for adjusting the supply to the injectors 11 and 12 as a function of the measurements which it takes continuously in real time.

Figure 3:
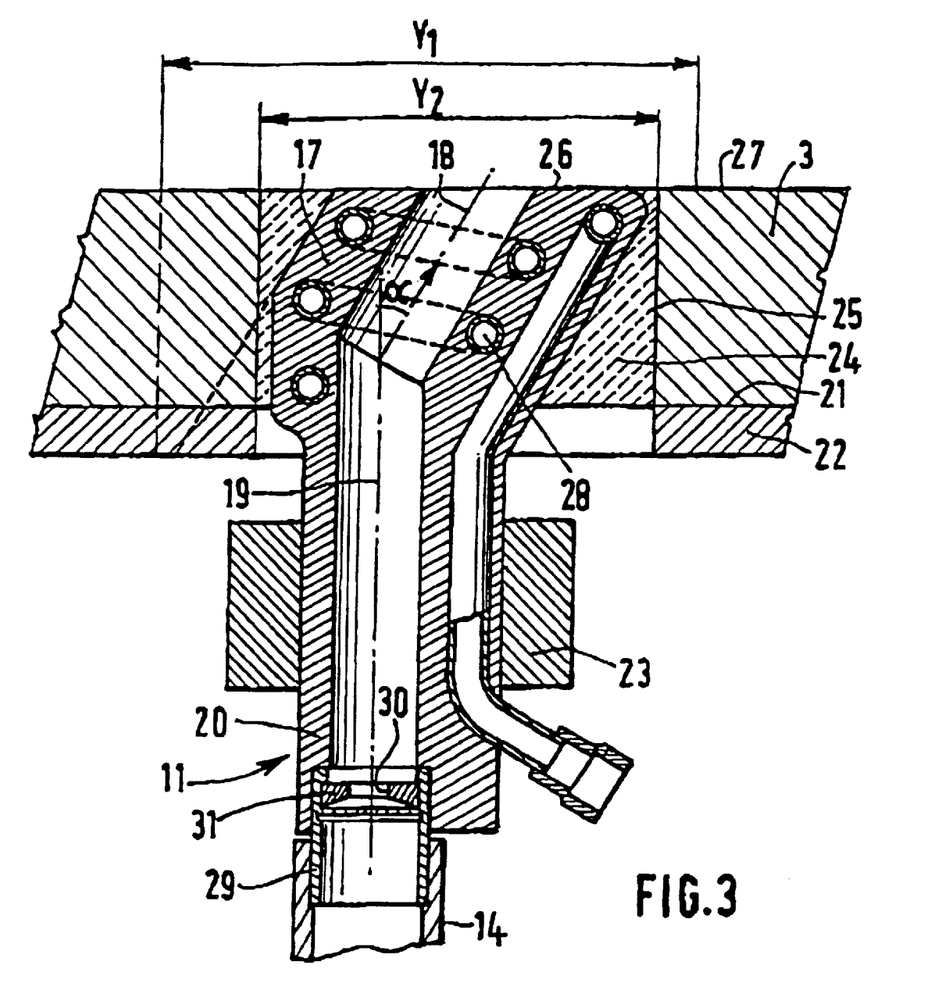
FIG. 3 represents a more detailed view in longitudinal section, on a larger scale, of an oxygen injector of the furnace.

Reference is now made to FIG. 3, which shows that any one of the injectors 11, 12, for example an injector 11, comprises a head 17 arranged through the thickness of the wall 3 of the furnace and having a substantially cylindrical gas passage of axis 18 which is inclined by an angle a to an axis 19 that is radial with respect to the furnace vertical axis X—X marked in FIG. 1.

The head 17 is formed at the end of a generally cylindrical body 20 whose axis coincides with the axis 19 when the injector is installed on the furnace, this body being hollowed by a gas passage which extends the one of axis 18 which passes through the head, the body thus protruding from the outer surface 21 of the wall 3 of the furnace, which wall is conventionally supported by a support structure 22 schematically represented in FIG. 2.

The body 20 of the injector is mounted so as to rotate about the axis 19 in a support bearing 23, also schematically represented in this figure. When the rotational adjustment is made, according to the particular features of the furnace, the position of the injector is fixed by means of a refractory filling material 24 arranged between the head 17 and the cylindrical opening 25% of the wall 3 which receives it. Regardless of the adjustment, the front face 26 of the head 17 is substantially flush with the inner face 27 of the wall 3.

FIG. 3 also represents a circuit 28 for circulating a cooling fluid such as cold water. Other characteristics and advantages of such an injector are described in EP-A-127,492 in the name of the Applicant Company.

A diaphragm 29 containing a fixed calibrated orifice 30 is mounted in a countersink 31 provided in the rear end of the body 20, and the supply conduit 14 is connected to this device. The outlet diameter of the injectors is also fixed and is very much greater than that of the orifice 30. It is between approximately 3 and 6 cm, and preferably close to 5 cm.

Furthermore, as in the aforementioned European patent, the front end of the conduit 14 may be equipped with a protective non-return valve (not represented).

During operation, alternate charging/casting and melting steps are carried out. During each step, the analyser 16 compares the CO concentration in the fumes with a low set-point value and adjusts the supply to the injectors accordingly.

Throughout operation, the oxygen flow rate per injector is kept between approximately 50 and 1,200 $Sm^3/h$ (1 $Sm^3/h$ is one $m^3$ under standard temperature and pressure conditions), and the oxygen outlet speed, taking into account the dimensioning of the injectors and the outlet pressure which is substantially atmospheric pressure, is between approximately 5 and 150 m/s. The preferred value ranges are, for the flow rate per injector, 100 to 900 $Sm^3/h$ and, for the outlet speed, 15 to 125 m/s.

If the flow rate per injector exceeds approximately 1,200 $Sm^3/h$, there is a high risk of rapid destruction of the refractory panels constituting the wall 3 of the furnace and/or oxidation of at least one electrode and/or the metal pool.

It has been observed that, with such a parameter combination, the specific electricity consumption, for a given specific oxygen consumption, is particularly low.

This has been confirmed by tests carried out with an 85 tonne capacity furnace of the type illustrated in FIGS. 1 to 3, having six injectors of outlet diameter 50 mm, with a maximum flow rate per injector of 700 $Sm^3/h$ displayed on the adjustment device 16 and a small injector protection flow rate of approximately 50 to 70 $Sm^3/h$ during the periods when the stream is not flowing.

The electrical consumption in this furnace proved to be much less, when all the injectors are supplied, than the case when four of the six injectors are supplied, with substantially identical specific oxygen consumption. This demonstrates the improvement in the post-combustion performance when the injector outlet speed of the oxygen jets is reduced.

Figure 4:
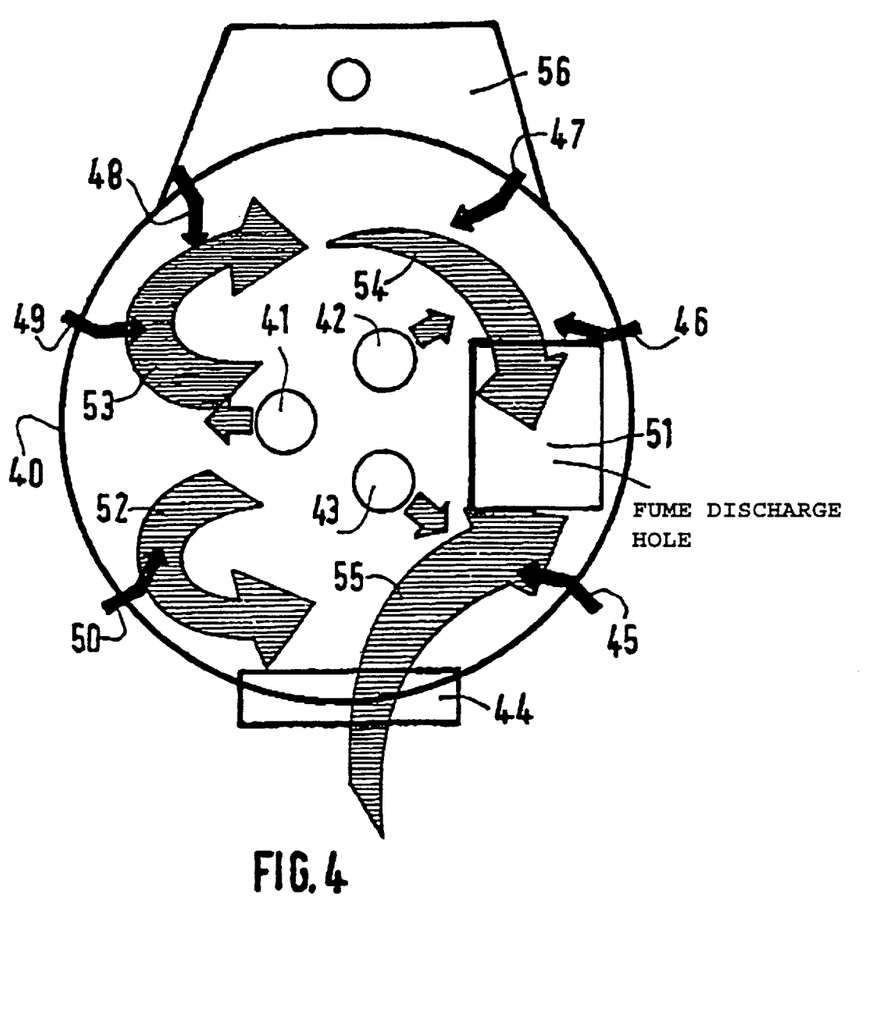
FIG. 4 represents a schematic plan view of the furnace.

FIG. 4 represents a schematic plan view of an arc furnace with a schematic representation of the flow of the gases in the furnace. The furnace 40 includes three electrodes 41, 42 and 43 which pass through the roof of the furnace, and through which gases can escape. The air essentially enters through the opening 44 or slag door and escapes, together with the fumes, essentially through the "fourth" hole 51. The molten metal is discharged through the casting hole 56. Six oxygen injectors 45, 46, 47, 48, 49 and 50 are uniformly distributed at the periphery of the furnace, substantially all in the same horizontal plane. The movement of the gases and fumes in the furnace is represented by the arrows 52, 53, 54 and 55.

During operation, the arcing of the electrodes displaces the gases to the periphery. The stream schematized by the arrow 53 starts from the centre (electrodes), moves towards the wall 40, then along it and continues to the fourth hole 51. Similarly, the stream schematized by the arrow 54 moves along the wall of the furnace and escapes through the fourth hole 51. The air 55 entering through the slag door is directed towards the "fourth hole" 51 and a stream 52 moves away from the electrodes towards the wall, in the direction of the door 44 and the hole 51.

According to the invention, the oxygen injectors are arranged in such a way as to inject the oxygen substantially in countercurrent flow with respect to the fumes: the injector 50 in countercurrent flow with the stream 52; 48 and 49 in countercurrent flow with the gas stream 53; 46 and 47 in countercurrent flow with the stream 54; and 45 in countercurrent flow with the gas stream 55.

Figure 5:
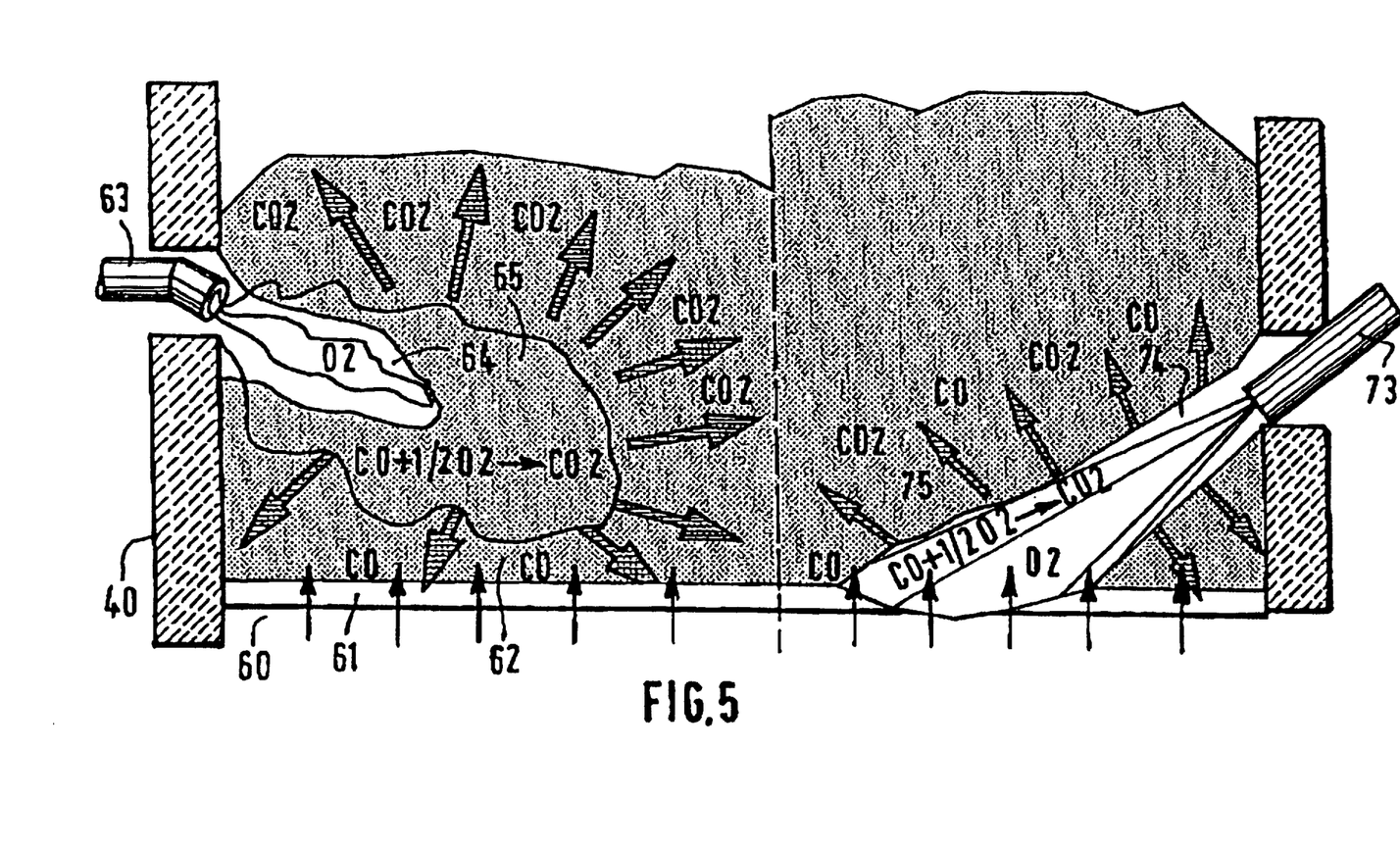
FIG. 5 represents a schematic comparison of the prior art combustion with that of the present invention.

FIG. 5 is a comparative illustration of the prior art (right-hand part of the figure) and of the invention (left-hand part of the figure). According to the prior art, the oxygen lance 73, directed at the surface of the slag 61 above the metal pool 60, injects oxygen at high (supersonic) speed through the gases/fumes in the furnace 62.

Because of its high speed, the oxygen comes into contact with the molten steel and the following reaction takes place:

This reaction is detrimental because it consumes iron and oxygen to form slag.

The iron also reacts with the carbon dioxide created by reaction of carbon monoxide with oxygen. This carbon dioxide is brought into contact with the metal pool by oxygen at high speed, thus creating even more FeO slag and a little carbon monoxide, according to the reaction:

Unfortunately, the CO formed does not react with the oxygen, because the latter is elsewhere consumed (see above) unless considerable quantities of oxygen were injected, some of which would be lost.

The carbon dioxide also reacts with the carbon in the molten steel, which causes a decarburization reaction (which is therefore detrimental) and generates CO which is itself not burnt.

It is after having established the existence of the various technical problems cited above and having analysed the various detrimental reactions that the Applicant Company developed the invention, in which oxygen is injected at low speed through the injector 63, creating a gaseous cloud 64 which remains above the metal pool 60 and reacts with the CO entering the region 65 from the pool (and exclusively only with the CO) according to the reaction:

All the carbon monoxide generated by the pool is thus burnt with the oxygen and true (exothermic) post-combustion of the CO is thus produced, with an energetically optimized quantity of oxygen.

Figure 6:
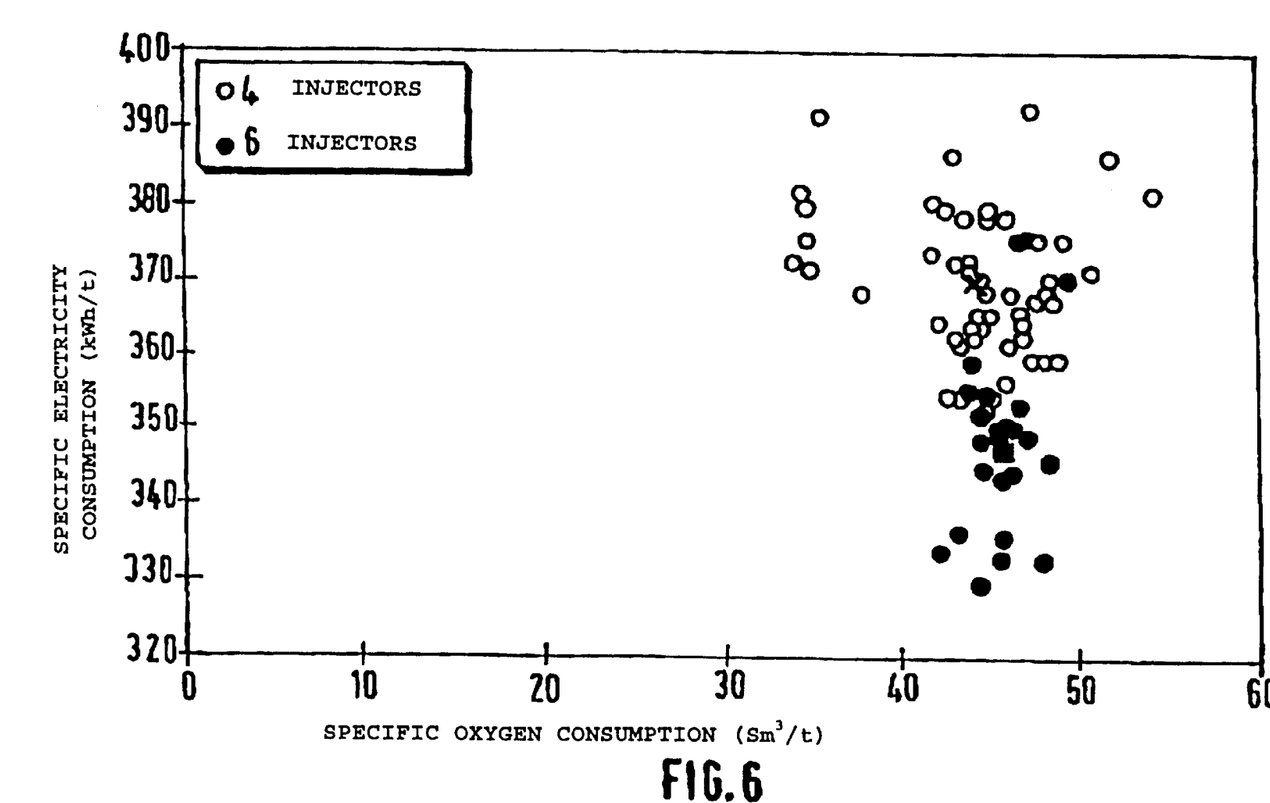
FIG. 6 represents a curve of sme cific electricity consumptions as a function of specific oxygen consumption, taking into account the number of injectors used.

FIG. 6 represents (white circles) the specific electricity consumptions (kWh/t) relative to the specific oxygen consumptions with four injectors, and (black circles) with six oxygen injectors, all other things being equal. Each circle represents one casting. It is clear that the specific electricity consumption is greatly improved with six injectors compared with four.

On average, over a large number of castings, the following results are obtained:

|  | 6 INJECTORS | 4 INJECTORS |
|---|---|---|
| $O_2$ CONSUMPTION PER CASTING (AVERAGE) $Sm^3$/tonne | 45.6 | 44.2 |
| AVERAGE FLOW RATE ($Sm^3$/h) | 280 | 425 |
| SPEED OF INJECTED OXYGEN (m/s) | 40 | 60 |
| ELECTRICAL CONSUMPTION (kWh/t) | 347 | 369 |

Figure 7:
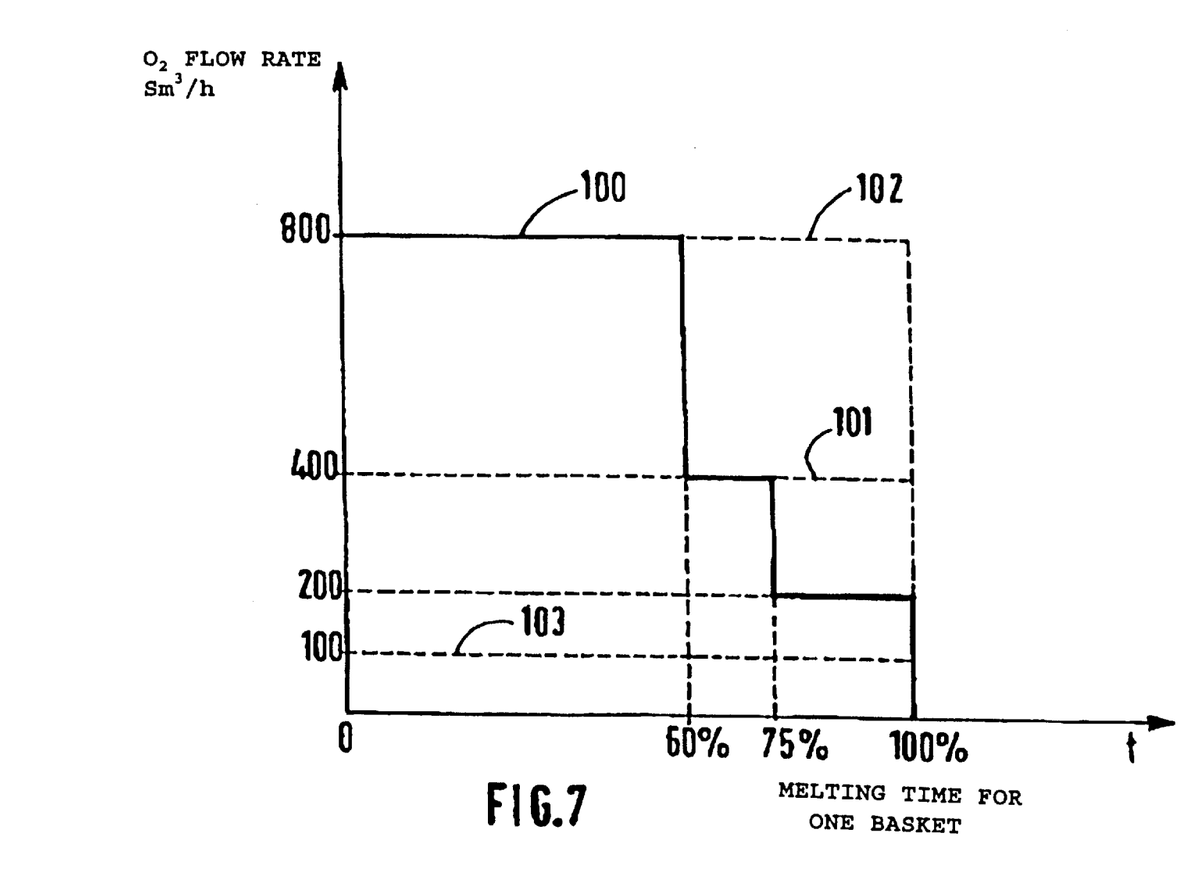
FIG. 7 represents an illustrative embodiment of oxygen injection between two stepped levels by adjustment based on the carbon monoxide.

FIG. 7 represents an example of stepped controlled oxygen injection. When the carbon monoxide content is $\geq 4$ vol% in the fumes, a maximum of 800 $Sm^3$/h of oxygen are injected into the furnace for the first 60% of the melting time for a charge. If it is less than 4 vol%, then a flow rate of 100 $Sm^3$/h is injected. Between 60% and 75% of the melting time, the injection levels are adjusted in the same way between 400 $Sm^3$/h and 100 $Sm^3$/h, then between 75% and 100% of the time, between 200 $Sm^3$/h and 100 $Sm^3$/h. The curve 100 which is followed is represented in solid lines. According to a first variant, it is possible to remain at a step level of between 800 and 100 $Sm^3$/h (along curve 102). It is also possible from 60 to 100% of the time to remain between 400 and 100 $Sm^3$/h (curve 101).

Of course, all the injectors can be adjusted on the basis of the same set-point value, for example 4 vol% of CO in the fumes, or on the basis of different set-point values (one value per injector or the same value for one or more groups of injectors).

COMPARATIVE EXAMPLE

The example below is a comparison between an installation operating according to the prior art (hereafter referred to as "BURNER PC") and the same installation operating according to the process of the invention (hereafter referred to as "INVENTION PC"). This example shows an energy saving of 18 kW/h/tonne of metal produced, which for a casting of approximately 100 t in slightly more than one hour represents a saving of 1,800 kW/h. The installation according to the prior art included four high-speed oxygen injections (250 m/s), whereas the installation according to the invention included four low-speed oxygen injections (110 m/s) according to the invention. The conditions (apart from those described below) were substantially identical in both cases. The results obtained can be collated as follows:

|  | BURNER PC | INVENTION PC |
|---|---|---|
| ELECTRICAL CONSUMPTION (kWh/t) | 377 | 359 |
| ELECTRICAL POWER SUPPLY DURATION (minutes) | 57.5 | 52.4 |
| TOTAL $O_2$ ($Sm^3$/t) INJECTED DURING THE ENTIRE CASTING | 33.6 | 37.1 |
| $O_2$ ($Sm^3$/t) INJECTED FOR THE POST-COMBUSTION | 11.4 | 13.0 |
| MAXIMUM TOTAL OXYGEN FLOW RATE ($Sm^3$/h) | 1,800 | 3,200 |
| MAXIMUM SPEED OF THE OXYGEN INJECTED (m/s) | 252 | 113 |

We claim:

1. A process for melting a charge in a furnace, comprising:
supplying energy of fusion to the charge, wherein gases comprising at least one combustible gas are generated during the melting; and
performing a post-combustion of the combustible gas by injecting an oxidant gas containing more than 25% by volume of oxygen during at least some periods of the process, wherein the oxidant gas is injected above the charge, in the form of at least one oxidant gas jet, each jet having a flow rate of between approximately 50 and 1200 $Sm^3$/h and a speed of injection into the furnace of between approximately 5 m/s and 150 m/s.

2. The process according to claim 1, wherein the at least one combustible gas comprises carbon monoxide.

3. The process according to claim 1, wherein the furnace is an electrical arc furnace in which an arc flame generates main gas streams, and the injection direction of each said oxidant gas jet coincides substantially with said main gas streams.

4. The process according to claims 1, wherein a holding flow of said oxidant gas is injected into the furnace at least during some periods in which no post-combustion is performed, to prevent or reduce clogging of oxidant gas injectors through which said oxidant gas is injected, said holding flow having a speed of injection of between approximately 5 m/s and 20 m/s.

5. The process according to claim 1, wherein the oxidant gas of at least one said oxidant gas jet is injected tangentially with respect to a wall of the furnace, at an angle of between 25% and 40°.

6. The furnace according to claim 5, wherein said angle is approximately 30°.

7. The process according to claim 1, wherein the oxidant gas of at least one said oxidant gas jet is injected downwards from a side wall of the furnace, at an angle of between 10° and 20°, with respect to the horizontal.

8. The process according to claim 7, wherein said angle is approximately 15° with respect to the horizontal.

9. The process according to claim 1, wherein the oxidant gas is injected with at least three injectors, and is uniformly distributed over a lateral surface of the furnace.

10. The process according to claim 9, wherein the oxidant gas is injected with four injectors.

11. The process according to claim 1, wherein each said oxidant gas jet has a flow rate of between approximately 80 and 850 $Sm^3$/h and a gas outlet speed from injectors of between approximately 50 and 125 m/s.

12. The process according to claim 11, wherein each said oxidant gas jet has a flow rate of between approximately 80 and 850 $Sm^3$/h and a speed of injection into the furnace of between approximately 50 and 125 m/s.

13. The process according to claim 12, wherein each said oxidant gas jet has a speed of injection into the furnace of approximately 100 m/s.

14. The process according to claim 1, wherein fumes from the furnace are continuously analyzed, said oxidant gas flow rate being adjusted as a function of the results of the analysis.

15. The process according to claim 14, wherein the furnace is an electrical arc furnace for melting scrap for the production of steels, the fume analysis comprising a measurement of carbon monoxide concentration in the fumes.

16. The process according to claim 1, wherein a plurality of injectors are used having, at their outlet, a component which is tangential with respect to the vertical axis of the furnace, the successive groups of injectors being arranged at different levels and oriented in alternate circumferential directions.

17. The process according to claim 1, wherein a plurality of injectors, through which said oxidant gas is injected, are provided and arranged at the same level, some of said injectors having a circumferential component in a first direction and a downward component at a first angle with respect to horizontal, the other injectors having a circumferential component in a direction opposite said first direction and a downward component at a second angle with respect to horizontal.

18. The process according to claim 17, wherein the first angle and the second angle are different.

19. The process according to claim 1, wherein the oxidant gas is oxygen having a purity of at least 88%.

20. The process according to claim 1, wherein the oxidant gas jet flow rate is varied during the post-combustion.

21. The process according to claim 20, wherein the oxidant gas jet flow rate is varied with stepped oxygen injection.

22. The process according to claim 1, wherein a holding flow of said oxidant gas is injected into the furnace at least during some periods in which no post-combustion is performed, wherein said oxidant gas is air.

23. The process according to claim 1, wherein at least six oxidant gas injectors are used.

24. The process according to claim 1, wherein each said oxidant gas injector is placed in an upper half of the furnace relative to the level of the charge.

25. The process according to claim 1, wherein the oxidant gas is mixed with at least some fumes produced by the furnace, thereby preheating the oxidant gas before injection into the furnace.

26. The process according to claim 1, wherein the oxidant gas is preheated before introduction into the furnace.

* * * * *